(12) United States Patent
Narayanan et al.

(10) Patent No.: US 12,423,259 B2
(45) Date of Patent: Sep. 23, 2025

(54) FABRIC CONNECTION ASSIST TRANSCEIVER DEVICE IDENTIFICATION SYSTEM

(71) Applicant: Dell Products L.P., Round Rock, TX (US)

(72) Inventors: Padmanabhan Narayanan, Chennai (IN); Vamshidhar Varre, Hyderabad (IN); Ming Chung Chow, Pleasanton, CA (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/184,812

(22) Filed: Mar. 16, 2023

(65) Prior Publication Data

US 2024/0311324 A1 Sep. 19, 2024

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC .......... G06F 13/4068; G06F 2213/40
USPC .......... 710/8, 16, 32, 62, 300, 305
See application file for complete search history.

(56) References Cited

U.S. PATENT DOCUMENTS

| | | | | |
|---|---|---|---|---|
| 6,137,802 A * | 10/2000 | Jones | ................. | H04Q 11/0478 370/445 |
| 7,711,325 B2 * | 5/2010 | Sathath | ................. | G06F 13/409 455/66.1 |
| 8,655,988 B2 * | 2/2014 | Souza | ................. | H04L 67/125 370/254 |
| 2004/0153539 A1 * | 8/2004 | Lyon | ................. | G06K 19/077 709/224 |
| 2007/0147318 A1 * | 6/2007 | Ross | ................. | H04W 48/16 370/338 |
| 2007/0168572 A1 * | 7/2007 | Miyazawa | .......... | H04L 41/0856 710/8 |
| 2008/0126655 A1 * | 5/2008 | Baier | ................. | G06F 11/267 710/301 |
| 2008/0288707 A1 * | 11/2008 | Nicolet | ............... | G06F 13/4068 710/310 |
| 2009/0271552 A1 * | 10/2009 | Pyk | ................. | G06F 13/4068 710/313 |

(Continued)

*Primary Examiner* — Tim T Vo
*Assistant Examiner* — Henry W Yu
(74) *Attorney, Agent, or Firm* — Joseph Mencher

(57) ABSTRACT

A fabric connection assist transceiver device identification system includes a transceiver device having a chassis. A board housed in the chassis includes a networking device connector that is configured to connect to a networking device, a fabric connector that is configured to connect to a fabric, an antenna, and a wireless Electronically Erasable Programmable Read-Only Memory (EEPROM) device that is coupled to the networking device connector and the antenna. The wireless EEPROM device stores first transceiver operating information in at least one first storage element included in the wireless EEPROM device, and provides wireless read access to the first transceiver operating information to a mobile computing device via the antenna when the mobile computing device is positioned a threshold distance from the antenna while the networking device connector is not connected to a networking device.

20 Claims, 9 Drawing Sheets

(56) References Cited

U.S. PATENT DOCUMENTS

| | | | |
|---|---|---|---|
| 2010/0189010 A1* | 7/2010 | Black | H04L 49/351 370/254 |
| 2010/0211699 A1* | 8/2010 | Chang | G06F 8/65 710/13 |
| 2011/0063994 A1* | 3/2011 | Nix | H04B 5/79 370/254 |
| 2015/0319799 A1* | 11/2015 | Suzuki | H04W 84/20 370/338 |

* cited by examiner

FABRIC CONNECTION ASSIST TRANSCEIVER DEVICE IDENTIFICATION SYSTEM

BACKGROUND

The present disclosure relates generally to information handling systems, and more particularly to identifying transceiver devices for use in connecting an information handling system to a fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art sometimes utilize transceiver devices to transmit data between computing devices connected to a networked system or other fabric. The use of transceiver devices to connect networking devices to a fabric cannot be automated completely, as fabric connection technicians must perform a variety of manual operations that include identifying transceiver devices and cabling required connect the networking devices to the fabric, configuring the transceiver devices, cabling, and networking devices, and/or performing other manual operations known in the art. The manual identification and configuration of transceiver devices, cabling, and networking devices can raise some issues.

For example, the fabric connection technicians discussed above may experience fabric connection issues resulting from incorrect transceiver device selection, connection of transceiver device(s) into the wrong port(s), improper seating of transceiver devices in the port(s), connection issues due to faulty transceiver device ports/cages, faulty transceiver devices or cables, configuration mismatches between transceiver devices and the devices they are being coupled to, and/or other issues that may substantially delay the availability of a network or other fabric.

Some of the inventors of the present disclosure have developed solutions to address some of the issues discussed above, and those solutions are described in U.S. Pat. No. 11,567,819, issued Jan. 31, 2023, the disclosure of which is incorporated by reference herein in its entirety. As described in that patent document, mobile-phone-based cabling assist applications may be provided to assist fabric connection technicians with the selection of cabling components for use in connecting networking devices to a fabric. However, such cabling assist applications rely on the knowledge of the individual fabric connection technician with regard to the transceiver devices and cabling that are recommended for use in connecting the networking devices to the fabric. Furthermore, in many cases fabric connection technicians may be unfamiliar with the transceiver devices and cabling being recommending, and as the numbers and types of transceiver devices, cabling, networking devices, and software applications utilized in fabrics increase, even fabric connection technicians familiar with the available transceiver devices and cabling may find it more and more difficult to properly configure the fabric.

Accordingly, it would be desirable to provide a fabric connection assist system that addresses the issues discussed above.

SUMMARY

According to one embodiment, a fabric connection assist system includes a mobile computing device including a fabric connection assist engine; and a transceiver device including: a networking device connector that is configured to connect to a networking device; a fabric connector that is configured to connect to a fabric; a wireless Electronically Erasable Programmable Read-Only Memory (EEPROM) system that is coupled to the networking device connector and that is configured to: store first transceiver operating information in at least one first storage element included in the wireless EEPROM system; and provide, in response to the mobile computing device being positioned within a threshold distance of the wireless EEPROM system when the networking device connector is not connected to a networking device, wireless read access to the first transceiver operating information stored in the at least one first storage element in the wireless EEPROM system to the fabric connection assist engine included in the mobile computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
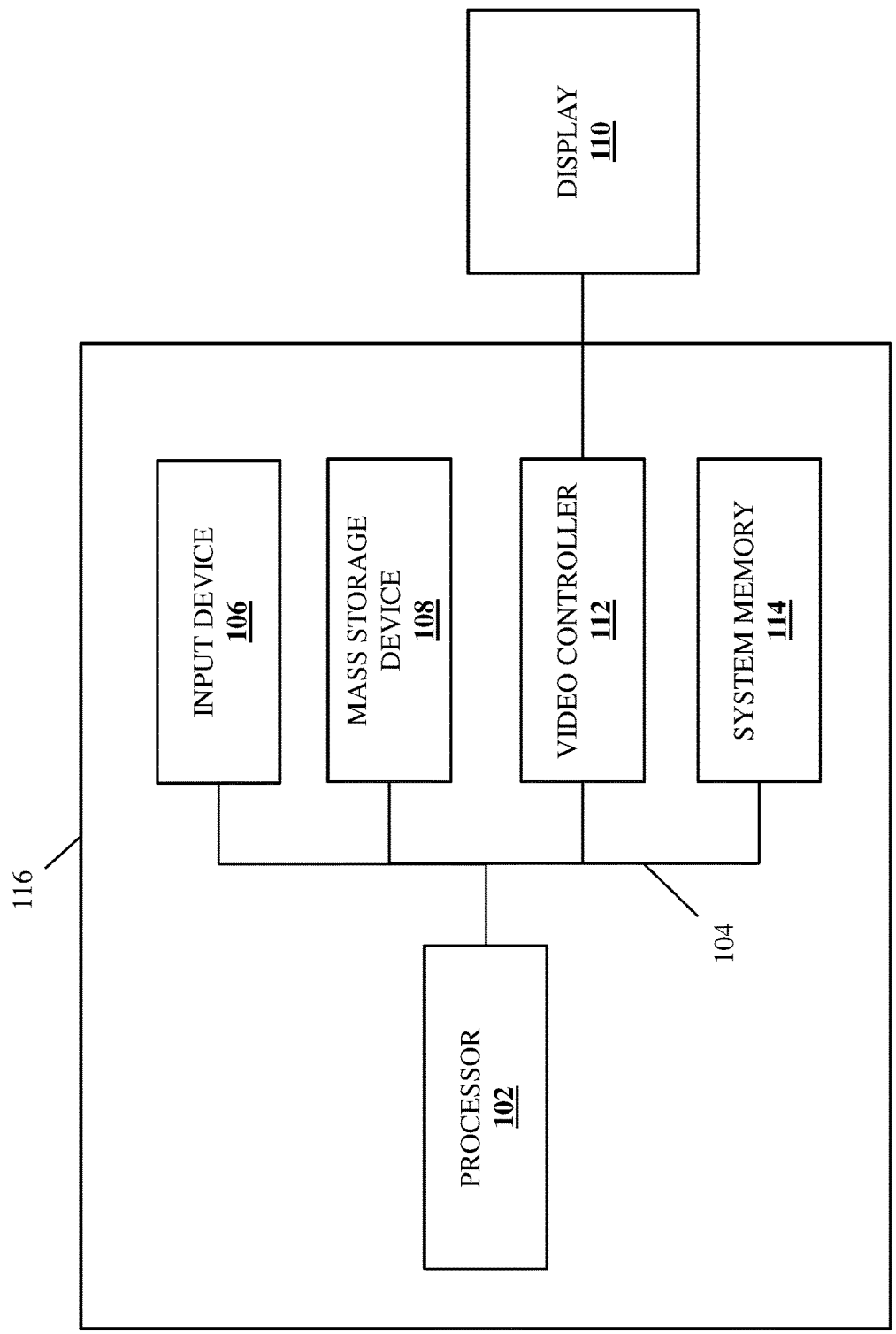
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
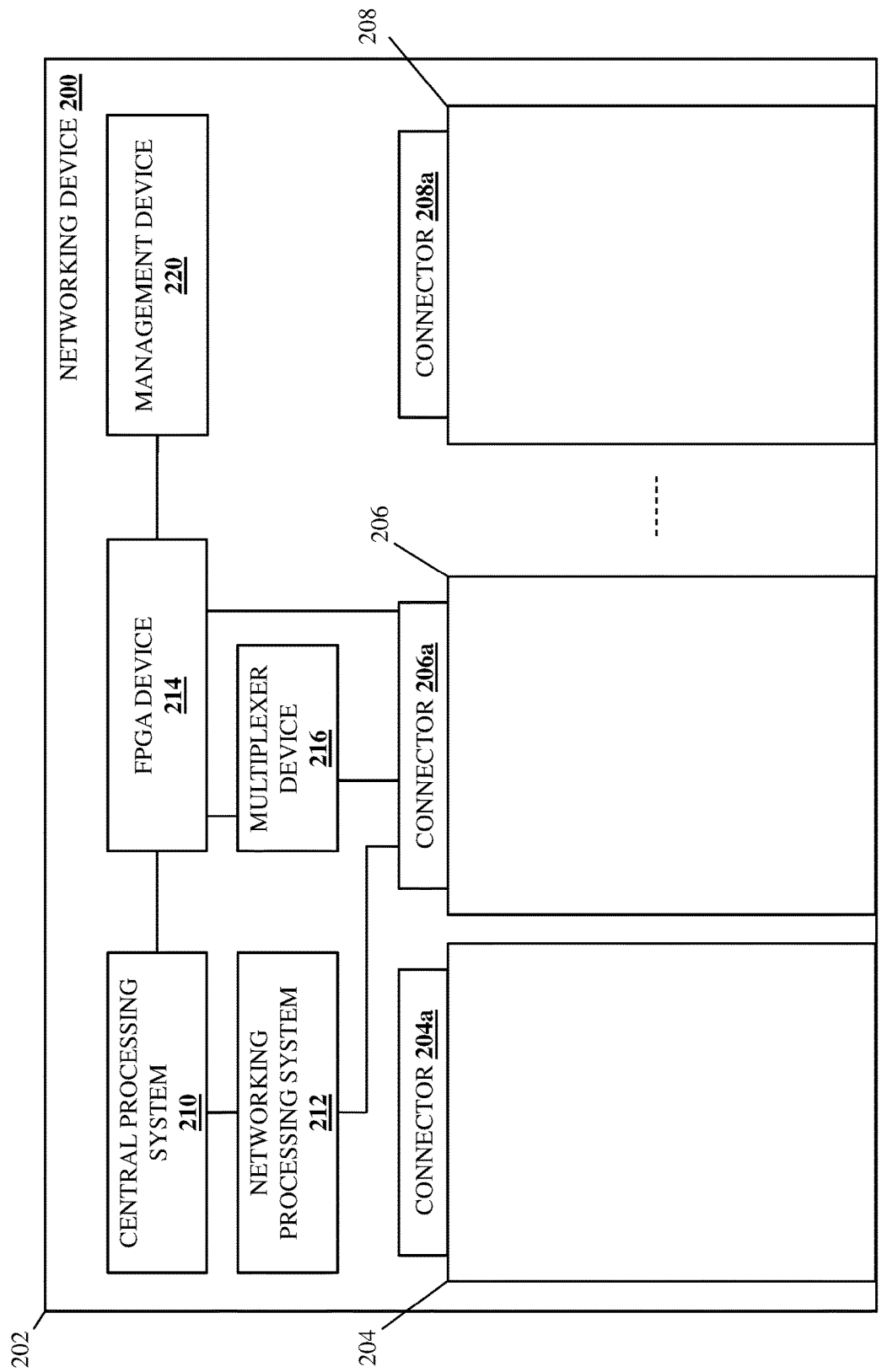
FIG. 2 is a schematic view illustrating an embodiment of a networking device that may be used with the fabric connection assist transceiver device identification system of the present disclosure.

Referring now to FIG. 2, an embodiment of a networking device 200 is illustrated that may be used with a transceiver device that is included in the fabric connection assist transceiver device identification system of the present disclosure. In an embodiment, the networking device 200 may be provided by the IHS 100 discussed above with reference to FIG. 1, and/or may include some or all of the components of the IHS 100, and in specific examples, may be provided by a switch device, a router device, and/or other networking devices known in the art. However, while illustrated and discussed as being provided by a networking device, one of skill in the art in possession of the present disclosure will appreciate that the functionality of the networking device 200 discussed below may be provided by other devices that are configured to operate similarly as the networking device 200 discussed below. In the illustrated embodiment, the networking device 200 includes a chassis 202 that houses the components of the networking device 200, only some of which are illustrated and discussed below.

For example, the chassis 202 may include a plurality of transceiver device ports 204, 206 and up to 208 that are configured to receive transceiver devices that connect the networking device 200 to a fabric. As illustrated in FIG. 2, the plurality of transceiver device ports 204-208 each include a respective transceiver device connector 204a, 206a and up to 208a that is configured to connect a transceiver device to the components housed in the chassis 202, discussed in further detail below. As such, while the illustrated embodiment only shows the transceiver device connector 206a as being connected to the components housed in the chassis 202, one of skill in the art in possession of the present disclosure will appreciate how the transceiver device connectors 204a and 208a may be connected to the components housed in the chassis 202 similarly as illustrated for the transceiver device connector 206a.

As illustrated in FIG. 2, the chassis 202 may also house a central processing system 210 that may be provided by Central Processing Unit (CPU) such as a host CPU System on Chip (SoC) that is configured to provide a Networking Operating System (NOS) as discussed below, and/or other central processing systems that would be apparent to one of skill in the art in possession of the present disclosure. The chassis 202 may also house a networking processing system 212 that may be provided by Networking Processing Unit (NPU) such as a Media Access Controller/PHYsical layer device (MAC/PHY) subsystem, and/or other networking processing systems that would be apparent to I in the art in possession of the present disclosure. As can be seen, the networking processing system 212 may be coupled to the central processing system 210 (e.g., via a Peripheral Component Interconnect express (PCIe) link), and to the transceiver device connectors (with only the coupling to the transceiver device connector 206a illustrated in FIG. 2).

The chassis 202 may also house a Field Programmable Gate Array (FPGA) device 214 (e.g., an FPGA complex) that is coupled to the central processing system 210 (e.g., via a PCIe link) and the transceiver device connectors (with only the coupling to the transceiver device connector 206a illustrated in FIG. 2). For example, the coupling of the FPGA device 214 to the transceiver device connectors may include one or more low speed control lines, such as a power mode (LPMode) line, a module present (ModPrsL) line, a power (Vcc) line, a ground (GND) line, a module select (ModSelL) line, a reset (ResetL) line, and/or any other FPGA/transceiver device port couplings that would be Ione of skill in the art in possession of the present disclosure. The chassis 202 may also house a multiplexer device 216 that may be provided by an Inter-Integrated Circuit (I2C) multiplexer (MUX) tree and/or other multiplexer devices th Iapparent to one of skill in the art in possession of the present disclosure. As can be seen, the multiplexer device 216 may be coupled to the FPGA device 214 (e.g., by an I2C link that may be provided by a Serial Data Line (SDL) and/or Serial Clock Line (SCL)) and each of the transceiver device connectors (with only the coupling to the transceiver device connector 206a illustrated in FIG. 2).

The chassis 202 may also house a management device 220 that is coupled to the FPGA device 214 (e.g., via a PCIe link), and that may be provided by a Baseboard Management Controller (BMC) device such as the integrated DELL® Remote Access Controller (iDRAC) available from DELL® computers of Round Rock, Texas, United States, and/or other management devices that would be apparent to one of skill in the art in possession of the present disclosure. However, while a specific networking device 200 has been illustrated and described, one of skill in the art in possession of the present disclosure will appreciate that networking devices (and other devices used with the fabric connection assist transceiver device identification system of the present disclosure) may include different components and/or component configurations while remaining within the scope of the present disclosure as well.

Figure 3:
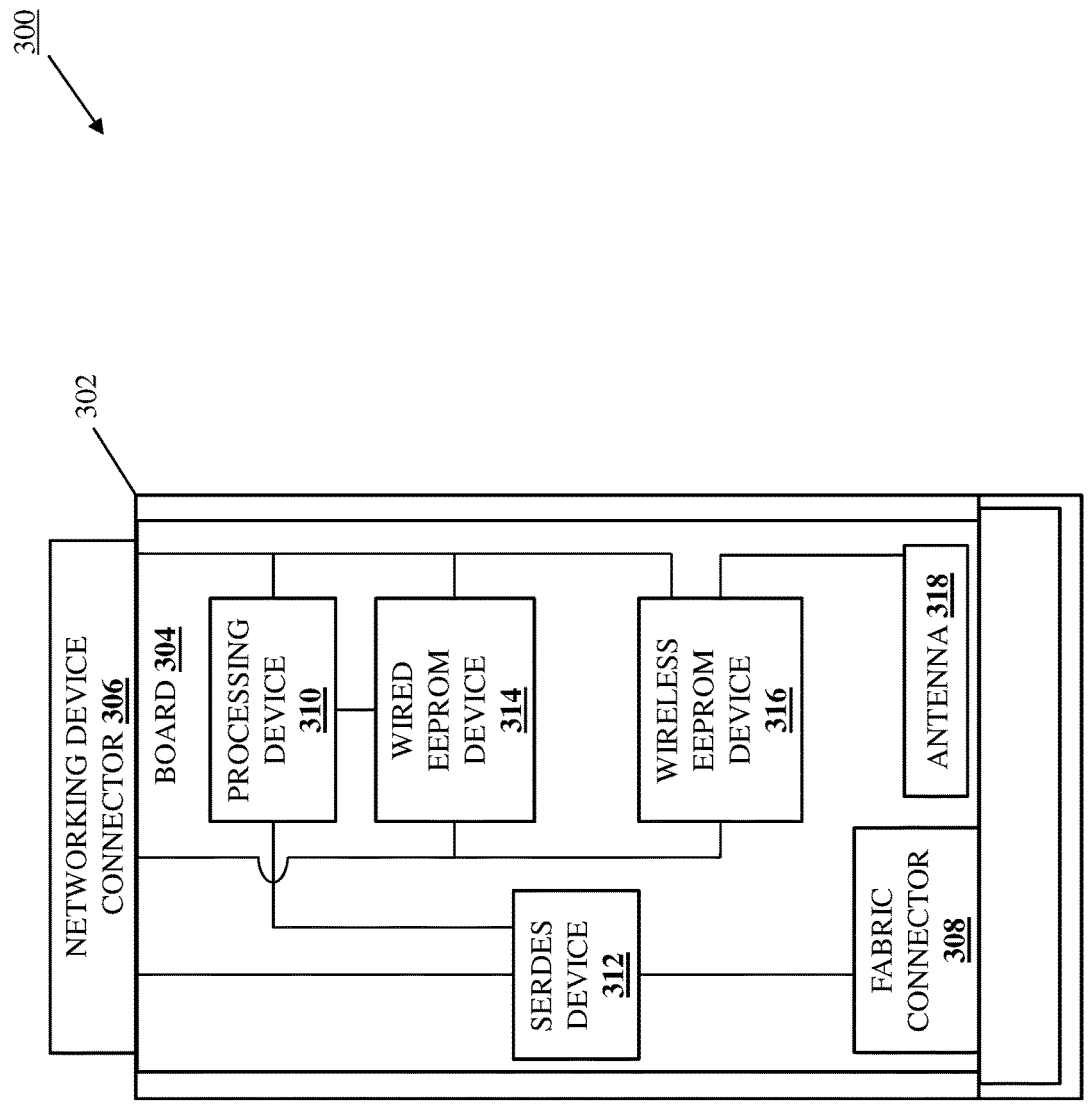
FIG. 3 is a schematic view illustrating an embodiment of a transceiver device that may be used with in the networking device of FIG. 2 and that may provide the fabric connection assist transceiver device identification system of the present disclosure.

Referring now to FIG. 3, an embodiment of a transceiver device 300 is illustrated that is included in the fabric connection assist transceiver device identification system of the present disclosure. In an embodiment, the transceiver device 300 may be provided by the IHS 100 discussed above with reference to FIG. 1 and/or may include some or all of the components of the IHS 100, and in specific examples may be provided by a Quad Small Form-factor Pluggable (QSFP) transceiver device such as a QSFP28 transceiver device, a QSFP28-DD transceiver device, a QSFP56-DD transceiver device, a QSFP+ transceiver device. However, while described as being provided by a QSFP transceiver device, one of skill in the art in possession of the present disclosure will appreciate how other transceiver devices (e.g., Octal Small Form-factor Pluggable (OSFP) transceiver devices) will fall within the scope of the present disclosure as well. Furthermore, while the embodiments of the system and methods of the present disclosure are described as providing a transceiver device identification system, one of skill in the art in possession of the present disclosure will appreciate how the teachings included herein may be generalized to provide a fabric connection device identification system that operates to identify to a fabric connection technician any of a variety of fabric connection devices (e.g., cabling systems, expanders, etc.) in a manner similar to that described below for the transceiver devices.

In the illustrated embodiment, the transceiver device 300 includes a chassis 302 that may house the components of the transceiver device 300, only some of which are illustrated and discussed below. For example, the chassis 302 may house a board 304 such as a circuit board that is configured to support the components of the transceiver device 300, only some of which are illustrated in FIG. 3. As illustrated, the transceiver device 300 may include a networking device connector 306 that is included on the board 304, that extends from a surface of the chassis 302, and that is configured to connect the transceiver device 300 to the networking device 200 discussed above with reference to FIG. 2. As illustrated, the transceiver device 300 may also include a fabric connector 308 that is included on the board 304, that extends from a surface of the chassis 302 opposite the networking device connector 306, and is configured to connect the transceiver device 300 to a fabric (e.g., cabling to other fabric devices).

The chassis 302 may also house a processing device 310 that may be provided by a MicroController Unit (MCU), SoC, or other processing devices that would be apparent to one of skill in the art in possession of the present disclosure.

As can be seen, the processing device 310 is included on the board 304 and is coupled to the networking device connector 306 (e.g., via trace(s) on the board 304). The chassis 302 may also house a serializer/deserializer (SerDes) device 312 (e.g., SerDes drivers) that is included on the board 304 and that is coupled to the networking device connector 306, the fabric connector 308, and the processing device 310 (e.g., via trace(s) on the board 304). As will be appreciated by one of skill in the art in possession of the present disclosure, when the transceiver device 300 is connected to the networking device 200, the SerDes device 312 may be utilized to transmit data packets received from the networking processing system 212 in the networking device 200 and to device(s) connected to the transceiver device 300 using any of a variety of data transmission techniques known in the art.

The chassis 302 may also house an EEPROM system that, in the embodiment illustrated in FIG. 3A, includes a wired Electronically Erasable Programmable Read-Only Memory (EEPROM) device 314 that is included on the board 304 and that is coupled to the networking device connector 306 and the processing device 310 (e.g., via a trace(s) on the board 304). As will be appreciated by one of skill in the art in possession of the present disclosure, the wired EEPROM device 314 may be provided by any of a variety of conventional wired EEPROM devices used in conventional transceiver devices (e.g., a wired EEPROM device accessed at an I2C address "0x50"), and as discussed below may be omitted in some embodiments of the present disclosure.

In the embodiment illustrated in FIG. 3, the EEPROM system housed in the chassis 302 may also include a wireless EEPROM device 316 that is described below as being provided by a dual-interface Near Field Communication (NFC) EEPROM device, but that one of skill in the art in possession of the present disclosure will appreciate may be provided by other wireless EEPROM devices while remaining within the scope of the present disclosure as well. In a specific example, and as discussed in further detail below, the dual interface NFC EEPROM device that provides the wireless EEPROM device 316 may be accessed either via a wired interface at an I2C address "0x70", or via a wireless interface using NFC wireless communications techniques. As can be seen, the wireless EEPROM device 316 is included on the board 304 and is coupled to the networking device connector 306 and the processing device 310 (e.g., via a trace(s) on the board 304). As will be appreciated by one of skill in the art in possession of the present disclosure, wireless EEPROM devices such as the NFC EEPROM devices discussed above may include an energy harvesting feature (and a corresponding "Vout" on the wireless EEPROM device 316) that is conventionally used for harvesting surplus power and providing it to other devices, and such energy harvesting features may not be utilized in the systems and methods of the present disclosure.

The chassis 302 may also house an antenna 318 (e.g., in the chassis "backshell") that may be provided by a microcoil NFC antenna with a form-factor sufficient to fit into the chassis 302 in the specific examples provided below, but that one of skill in the art in possession of the present disclosure will appreciate may be provided by other antennas while remaining within the scope of the present disclosure as well. However, while described as including an EEPROM system with a wired EEPROM device and wireless EEPROM device, one of skill in the art in possession of the present disclosure will appreciate how the transceiver device 300 may include other storage systems including a wired-access storage device and a wirelessly-accessible storage device while remaining within the scope of the present disclosure as well. Furthermore, while a specific transceiver device 300 has been illustrated and described, one of skill in the art in possession of the present disclosure will appreciate that a variety of transceiver devices that may include a variety of different components and/or component configurations may be utilized with the fabric connection assist transceiver device identification system while remaining within the scope of the present disclosure as well.

Figure 4:
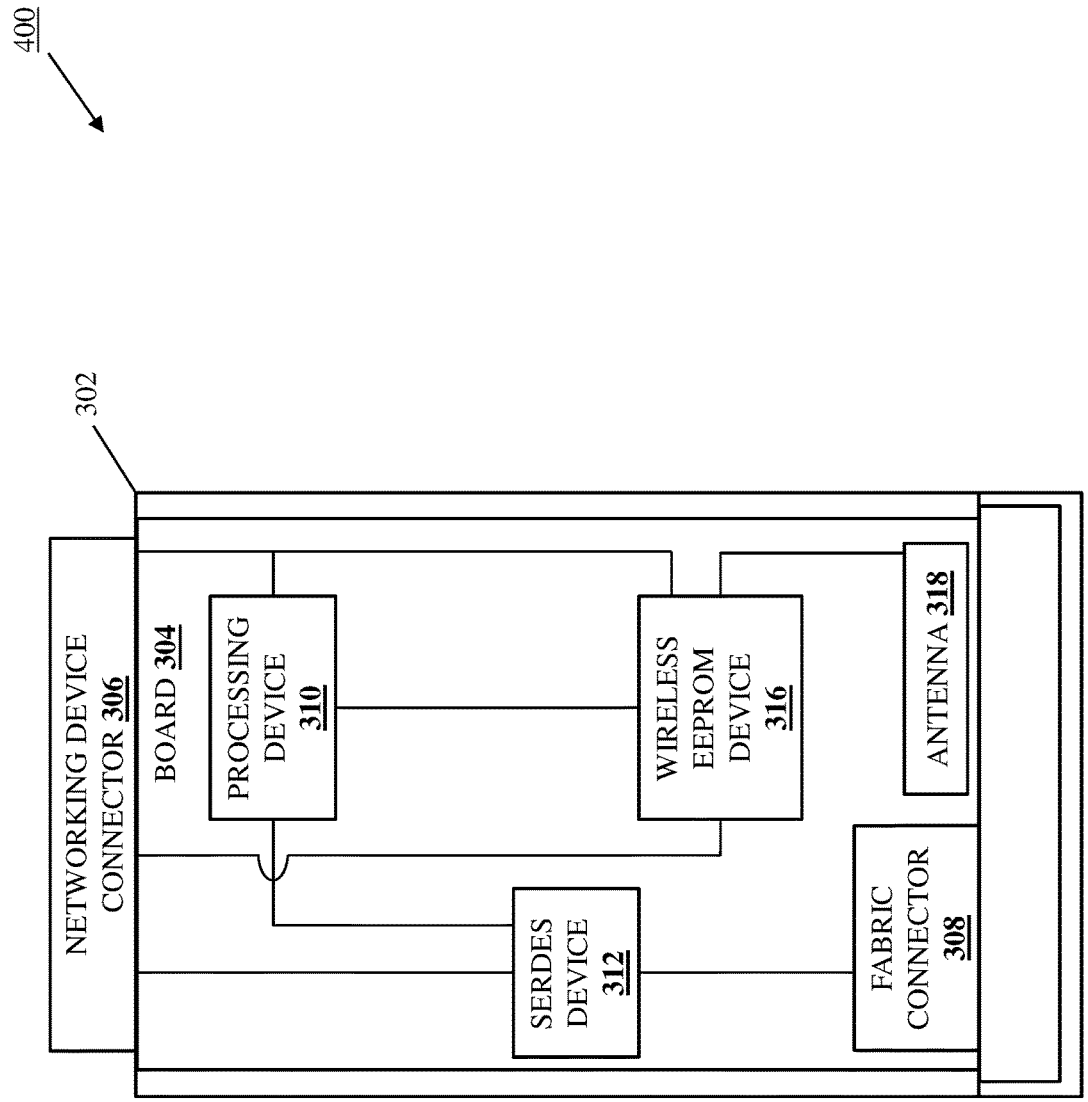
FIG. 4 is a schematic view illustrating an embodiment of a transceiver device that may be used with in the networking device of FIG. 2 and that may provide the fabric connection assist transceiver device identification system of the present disclosure.

For example, with reference to FIG. 4, a transceiver device 400 is illustrated that is substantially similar to the transceiver 300 discussed above with reference to FIG. 3 and thus similar elements have been provided with similar element numbers. As can be seen in the FIG. 4, the EEPROM system included in the transceiver device 400 omits the wired EEPROM device 314 included in the transceiver device 300 such that the functionality of the EEPROM system is provided by the wireless EEPROM device 316. As illustrated in FIG. 4, when the wired EEPROM device 314 is omitted from the EEPROM system in the transceiver device 400, the wireless EEPROM device 316 is coupled directly to the processing device 310 (e.g., via trace(s) on the board 304). As will be appreciated by one of skill in the art in possession of the present disclosure, in a specific example, the wireless EEPROM device 316 in the transceiver device 400 of FIG. 4 may be accessed at an I2C address "0x50". Furthermore, similarly as discussed above, while discussed as including a wireless EEPROM device, one of skill in the art in possession of the present disclosure will appreciate how the transceiver device 400 may include other wirelessly-accessible storage devices while remaining within the scope of the present disclosure as well. Thus, a wide variety of transceiver device components and/or component configurations may be utilized with the fabric connection assist transceiver device identification system while remaining within the scope of the present disclosure as well.

Figure 5:
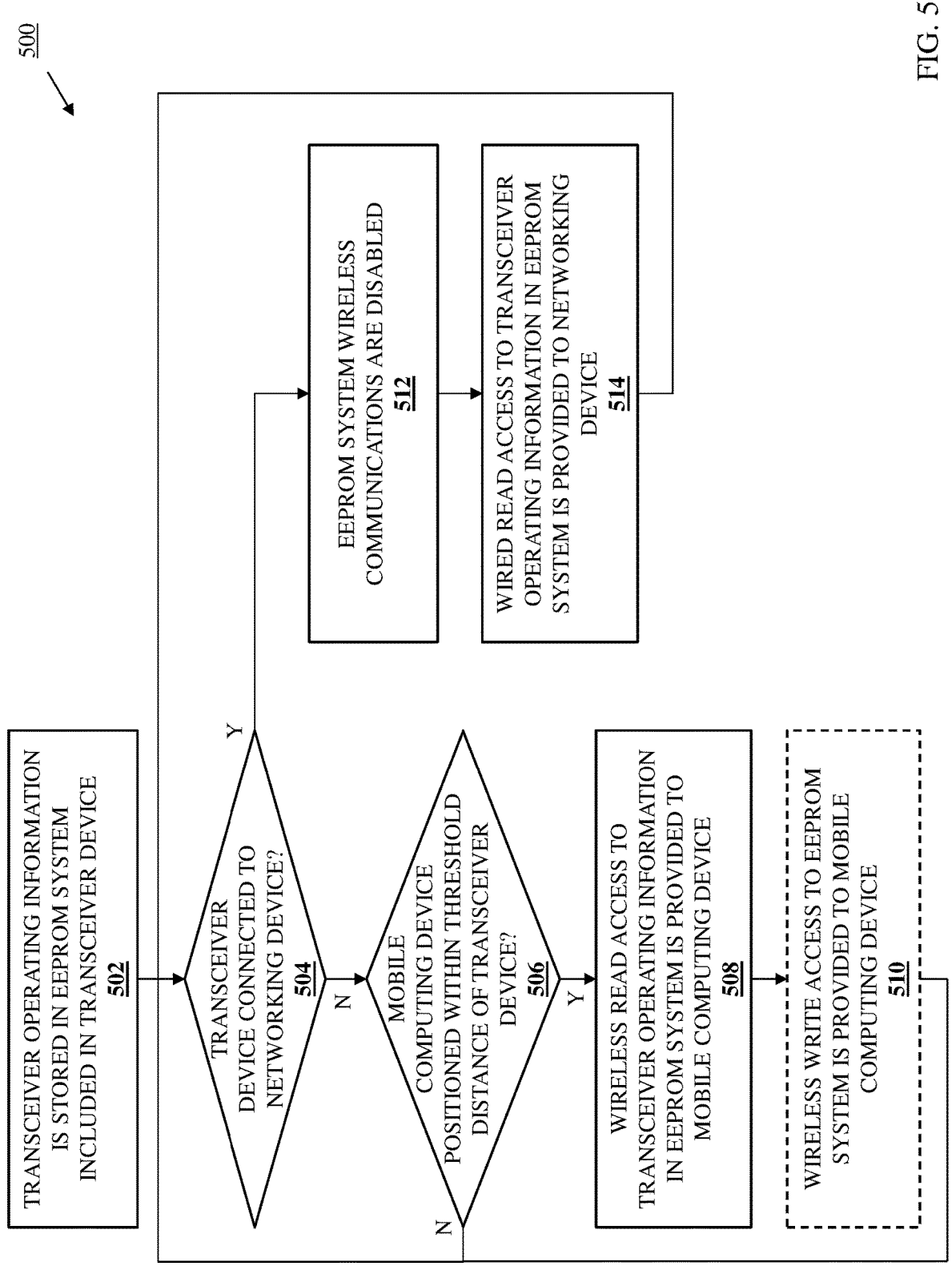
FIG. 5 is a flow chart illustrating an embodiment of a method for identifying a transceiver device for use in connecting a networking device to a fabric.

Referring now to FIG. 5, an embodiment of a method 500 for identifying transceiver devices for use in connecting a device to a fabric is illustrated. As discussed below, the systems and methods of the present disclosure provide for the wireless identification of a transceiver device that is not connected to a networking device to instruct a user to use that transceiver device to connect that networking device to a fabric. For example, the fabric connection assist transceiver device identification system of the present disclosure may include a transceiver device having a chassis. A board housed in the chassis includes a networking device connector that is configured to connect to a networking device, a fabric connector that is configured to connect to a fabric, an antenna, and a wireless Electronically Erasable Programmable Read-Only Memory (EEPROM) device that is coupled to the networking device connector and the antenna. The wireless EEPROM device stores first transceiver operating information in at least one first storage element included in the wireless EEPROM device, and provides wireless read access to the first transceiver operating information to a mobile computing device via the antenna when the mobile computing device is positioned a threshold distance from the antenna while the networking device connector is not connected to a networking device. As such, a user with the mobile computing device may confirm that a transceiver device selected based on a recommendation by a fabric connection assist engine is the correct transceiver device for connecting a networking device to a fabric.

The method 500 begins at block 502 where transceiver operating information is stored in an EEPROM system included in a transceiver device. In an embodiment of block 502, the transceiver device 300/400 discussed above with reference to FIGS. 3 and 4 may have transceiver operating information stored in its EEPROM system. For example, with reference to the transceiver device 300 discussed above with reference to FIG. 3, the transceiver operating information may be stored on the wired EEPROM device 314 and the wireless EEPROM device 316. To provide a specific example, during the manufacture of the transceiver device 300, a serial number for the transceiver device 300, a part number for the transceiver device 300, and/or a variety of other transceiver device details or other information for the transceiver device 300 may be written to the wired EEPROM device 314 by the transceiver device manufacturer.

Furthermore, during the manufacture of the transceiver device 300, at least some of the transceiver operating information written to the wired EEPROM device 314 may be written to the wireless EEPROM device 316 as well. To provide a specific example, an upper memory page 0 in the wired EEPROM device 314 (e.g., in which the serial number and/or the part number for the transceiver device 300 may be stored) may be replicated or otherwise stored in the wireless EEPROM device 316, which one of skill in the art in possession of the present disclosure will appreciate may be sufficient to enable the fabric connection assist transceiver identification functionality discussed below. However, while a specific example of the storage of transceiver operating information on the wired EEPROM device 314 and the wireless EEPROM device 316 has been described, one of skill in the art in possession of the present disclosure will appreciate how the transceiver operating information may be stored on the wired EEPROM device 314 and the wireless EEPROM device 316 in other manners that will enable the fabric connection assist transceiver identification functionality discussed below while remaining within the scope of the present disclosure as well. For example, the wireless EEPROM device 316 may include additional memory pages (e.g., other than the memory page 0 in the specific example provided above) that provide a command/response buffer, provide for the storage of a transceiver device usage history, and/or provide for the storage of other transceiver operating information that would be apparent to one of skill in the art in possession of the present disclosure.

As will be appreciated by one of skill in the art in possession of the present disclosure, the storage of the transceiver operating information using both the wired EEPROM device 314 and the wireless EEPROM device 316 may be implemented to allow the functionality of the wired EEPROM device 314 to remain separate from the functionality of the wireless EEPROM device 316. For example, as discussed below, some embodiments of the present disclosure may allow a user to write data to the wireless EEPROM device 316, and the wired EEPROM device 314 may be segregated from the wireless EEPROM device 316 by configuring the wired EEPROM device as a read-only device to ensure the security of the wired EEPROM device 314 in such embodiments by, for example, preventing corruption resulting from a data write to the wireless EEPROM device 316 from extending to the wired EEPROM device 314. In another example, the relatively large memory resources in the wired EEPROM device 314 may be utilized by an optical module in the transceiver device 300 (which one of skill in the art in possession of the present disclosure will recognize requires relatively more memory resources as the operation of the optical module becomes relatively more sophisticated), allowing the wireless EEPROM device 316 to be configured with relatively small memory resources that are needed to enable the fabric connection assist transceiver identification functionality discussed below.

In another example, with reference to the transceiver device 400 discussed above with reference to FIG. 4, the transceiver operating information may be stored on the wireless EEPROM device 316. As will be appreciated by one of skill in the art in possession of the present disclosure, any transceiver operating information discussed above and/or that would be apparent to one of skill in the art in possession of the present disclosure as being stored on the wired EEPROM device 314 may instead by stored on the wireless EEPROM device 316 in an embodiment like that illustrated in FIG. 4 in which the transceiver device 400 does not include a wired EEPROM device 314. As such, some embodiments of the present disclosure may completely omit a conventional wired EEPROM device from the transceiver device, and may store all the transceiver operating information needed to utilize that transceiver device on the wireless EEPROM device of the present disclosure. However, while a specific example of the storage of transceiver operating information on the wireless EEPROM device 316 has been described, one of skill in the art in possession of the present disclosure will appreciate how the transceiver operating information may be stored on the wireless EEPROM device 316 in other manners that will enable the fabric connection assist transceiver identification functionality discussed below while remaining within the scope of the present disclosure as well.

The method 500 then proceeds to decision block 504 where the method 500 proceeds depending on whether the transceiver device is connected to a networking device. In an embodiment, at decision block 504, the method 500 will proceed depending on whether the transceiver device 300/400 is connected to the networking device 200 discussed above with reference to FIG. 2. As discussed below, transceiver devices 300/400 may be stored in an inventory or other storage location when not connected to the networking device 200, and then may be connected to the networking device 200 in order to couple that networking device 200 to a fabric. As will be appreciated by one of skill in the art in possession of the present disclosure, the connection of the transceiver device 300/400 to the networking device 200 may result in the networking device 200 powering the transceiver device 300/400 such that that transceiver device 300/400 may determine that it is connected to the networking device 200. As such, the method 500 may proceed at decision block 504 depending on whether the transceiver device 300/400 remains in inventory unconnected to the networking device 200, or is taken from inventory and connected to the networking device 200.

Figure 6A:
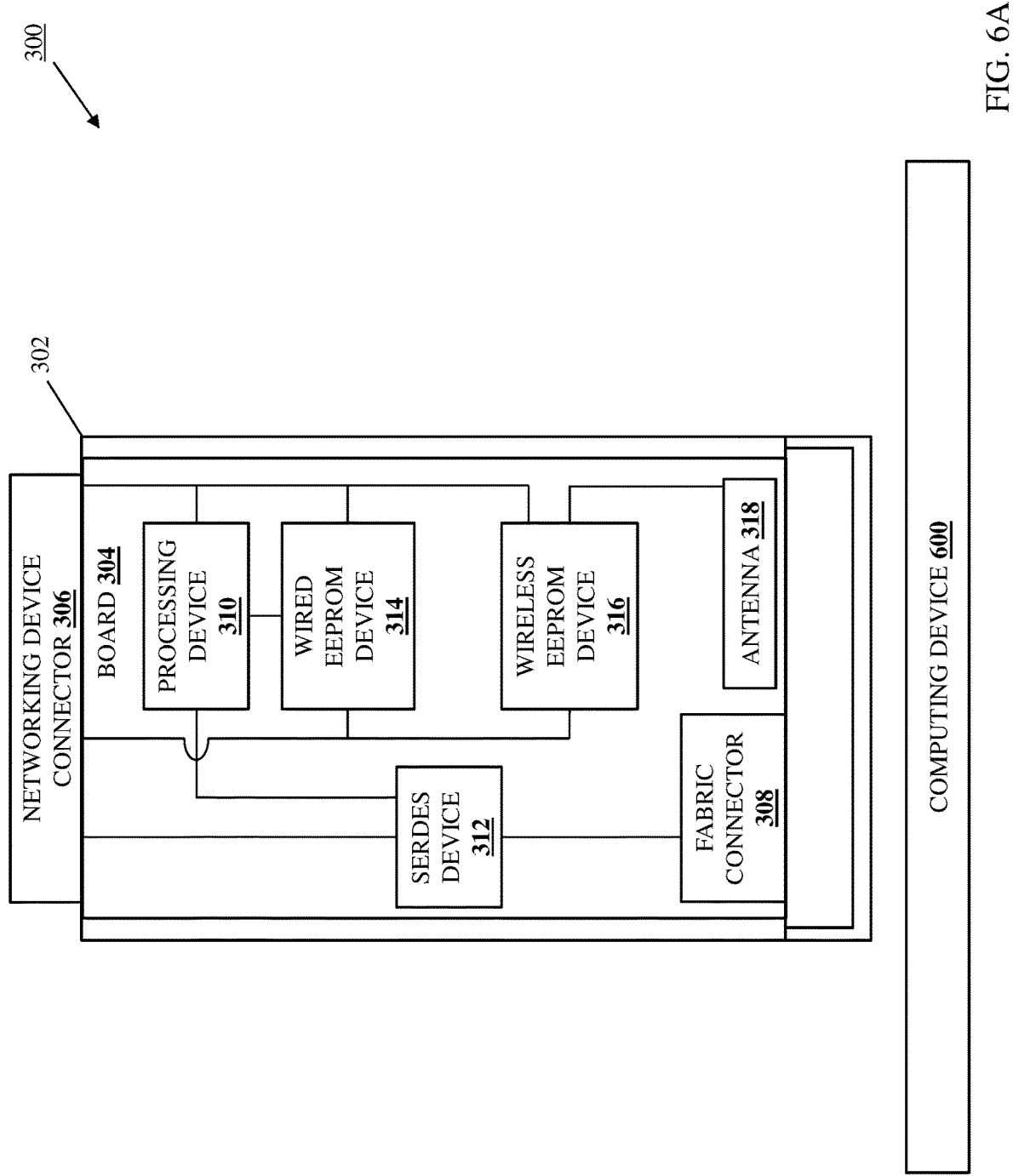
FIG. 6A is a schematic view illustrating an embodiment of the transceiver device of FIG. 3 operating with a mobile computing device during the method of FIG. 5.

If, at decision block 504, the transceiver device 300/400 is not connected to a networking device, the method 500 proceeds to decision block 506 where the method 500 proceeds depending on whether a mobile computing device is positioned within a threshold distance of the transceiver device. With reference to FIG. 6A, in an embodiment of decision block 506, the fabric connection assist transceiver device identification system of the present disclosure may include a mobile computing device 600 that may be provided by the IHS 100 discussed above with reference to FIG. 1 and/or may include some or all of the components of the IHS 100, and in specific examples, may be provided by a mobile phone, a tablet computing device, a laptop/notebook computing device, and/or other mobile computing devices that would be apparent to one of skill in the art in possession of the present disclosure.

Figure 6B:
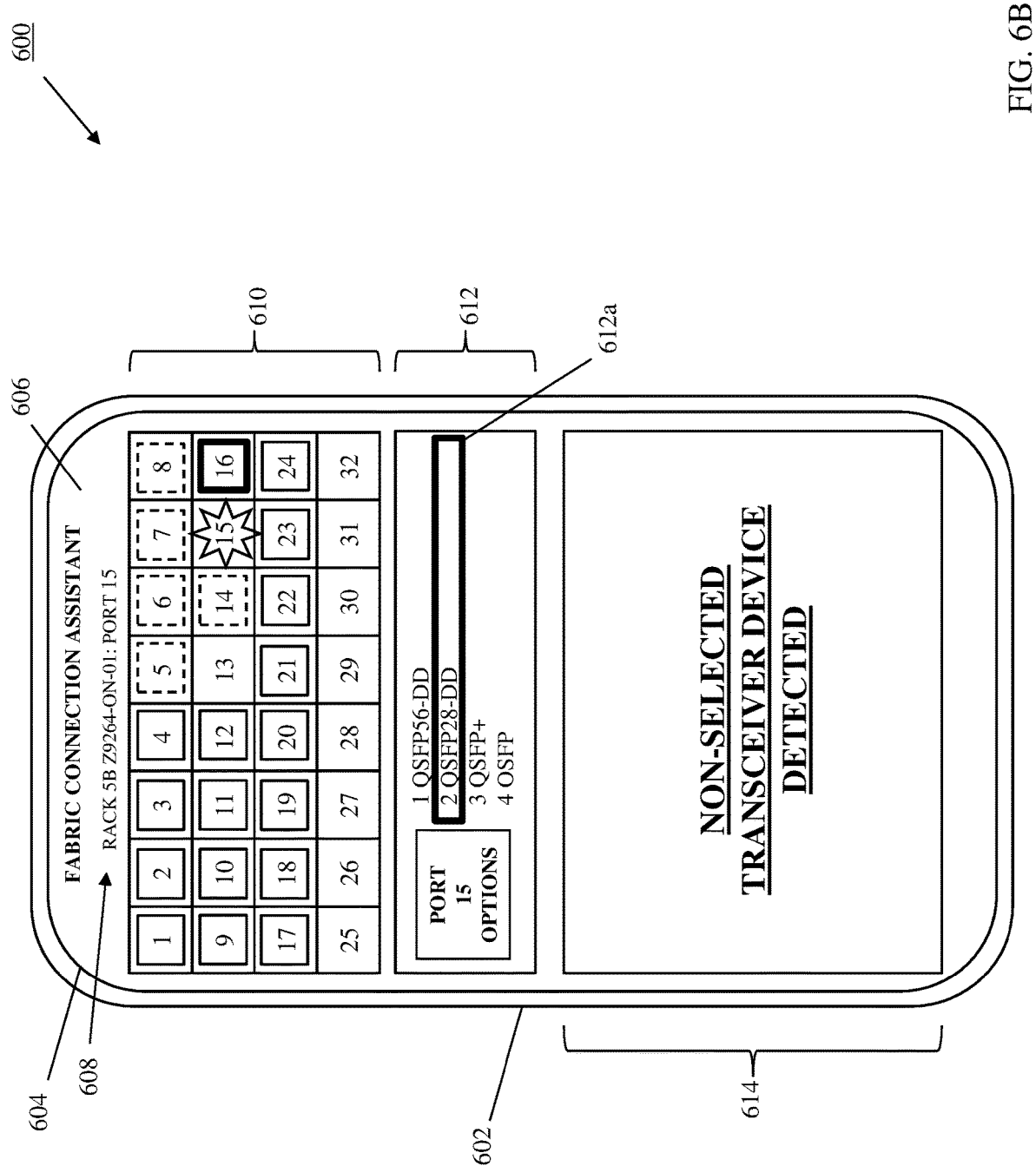
FIG. 6B is a schematic view illustrating an embodiment of a mobile computing device of FIG. 6A operating during the method of FIG. 5.

As will be appreciated by one of skill in the art in possession of the present disclosure, the positioning of the mobile computing device 600 within a threshold distance of the transceiver device 300/400 (e.g., a threshold NFC communication distance when the wireless EEPROM device 316 is an NFC EEPROM device and the mobile computing device 600 includes an NFC communication system), as illustrated in FIGS. 6A and 6B, may cause the mobile computing device 600 to wirelessly power the wireless EEPROM device 316 in the transceiver device 300/400 via the antenna 318 when the transceiver device 300/400 is not connected to the networking device 200. As such, the method 500 may proceed at decision block 506 depending on whether or not a mobile computing device 600 is positioned within the threshold distance of the transceiver device 300/400.

If, at decision block 506, a mobile computing device 600 is not positioned within the threshold distance of the transceiver device 300/400, the method 500 returns to decision block 504. As such, the method 500 may loop through decision blocks 504 and 506 as long as the transceiver device 300/400 is not connected to a networking device, and a mobile computing device is not within a threshold distance of the transceiver device 300/400.

If, at decision block 506, a mobile computing device 600 is positioned within the threshold distance of the transceiver device, the method 500 proceeds to block 508 where wireless read access to the transceiver operating information in the EEPROM system is provided to the mobile computing device 600. With reference to FIG. 6B, an embodiment the mobile computing device 600 is illustrated that may include a chassis 602 that houses the components of the mobile computing device 600. For example, the chassis 602 may house a processing system (not illustrated) and a memory system (not illustrated) that is coupled to the processing system and that includes instructions that, when executed by the processing system, cause the processing system to provide a fabric connection assist engine like that described by some of the inventors of the present disclosure in U.S. Pat. No. 11,567,819, issued Jan. 31, 2023, the disclosure of which is incorporated by reference herein in its entirety.

As illustrated, the chassis 602 may also house a display device 604 that is coupled to the fabric connection assist engine and that is configured to display any of the information provided by the fabric connection assist engine. However, while a specific mobile computing device 600 has been illustrated and described, one of skill in the art in possession of the present disclosure will recognize that mobile devices (or other devices operating according to the teachings of the present disclosure in a manner similar to that described below for the mobile computing device 600) may include a variety of components and/or component configurations for providing conventional mobile device functionality, as well as the functionality discussed below, while remaining within the scope of the present disclosure as well.

As described by some of the inventors of the present disclosure in U.S. Pat. No. 11,567,819, issued Jan. 31, 2023, the fabric connection assist engine in the mobile computing device 600 may provide a fabric connection assist screen 606 on the display device 604. In the specific example illustrated in FIG. 6B, the fabric connection assist screen 606 includes a fabric device connection operation identifier 608 that identifies a port on a fabric device (e.g., port "15" on switch device "Z9264-ON-01" in rack "5B" in the specific example of FIG. 6B) that a fabric technician may be currently connecting to a fabric. The fabric connection assist screen 606 also includes a port connection status section 610 that identifies the ports (e.g., via port identifiers 1-32) on the fabric device that includes the port that is currently being connected to the fabric, and includes port status indicators that indicate the status of the connection of each of the ports on the fabric device to the fabric.

As described by some of the inventors of the present disclosure in U.S. Pat. No. 11,567,819, issued Jan. 31, 2023, the port connection status section 610 may indicate to the fabric connection technician ports that have been successfully connected to an identified fabric connection component (e.g., the solid boxes for ports 1-4, 9-12, and 17-24), ports that have had a fabric connection component identified for connection to them (e.g., the dashed boxes for ports 5-8 and 14), ports that have had a fabric connection component connected to them and are associated with one or more errors (e.g., the bolded box for port 16), ports that are currently being connected to the fabric (e.g., the 8-point star for port 15), and ports that do not have a fabric connection component connected and that have not had a fabric connection component identified for connection to them (e.g., no indication for ports 13 and 25-32).

The fabric connection assist screen 606 may also display a supported fabric connection component section 612 that displays identifications for each fabric connection component that was identified by the fabric connection assist engine in the mobile computing device 600 for connection to the port currently being connected to the fabric (e.g., the QSFP56-DD transceiver device, QSFP28-DD transceiver device, QSFP+ transceiver device and OSFP transceiver device identified for port 15 in the illustrated example). As illustrated in FIG. 6B, the supported fabric connection component section 612 may be configured to provide an selected fabric connection component indicator 612*a* to indicate a fabric connection component (e.g., a QSFP28-DD transceiver device in the illustrated example) that has been selected for connection to the port that is currently being connected to the fabric (e.g., port "15" in the illustrated example). For example, as described by some of the inventors of the present disclosure in U.S. Pat. No. 11,567,819, issued Jan. 31, 2023, the fabric connection assist engine in the mobile computing device 600 may identify a plurality of fabric connection components that are compatible with the port that is currently being connected to the fabric, and one of those fabric connection components may be "selected" by the fabric connection assist engine and/or the fabric connection technician for retrieval and use in connecting that port to the fabric due to, for example, that "selected" fabric connection component providing the most optimized fabric connection for that port.

In an embodiment, in response to the supported fabric connection component section 612 on the mobile computing device 600 displaying the selected fabric connection component indicator 612*a* that indicates the fabric connection component (e.g., a QSFP28-DD transceiver device in the illustrated example) that has been selected for connection to the port that is currently being connected to the fabric (i.e., port 15 in the illustrated example), the fabric connection technician may take the mobile computing device 600 to a location where an inventory of transceiver devices is stored. The fabric connection technician may then begin positioning the mobile computing device 600 within the threshold distance of one or more transceiver devices 300/400 (e.g., the fabric connection technician may perform "NFC tap" operations between the mobile computing device 600 and the one or more transceiver devices 300/400).

As will be appreciated by one of skill in the art in possession of the present disclosure, when the fabric connection technician places the mobile computing device 600 within the threshold distance of any transceiver device 300/400, the wireless EEPROM device 316 in that transceiver device 300/400 may be wirelessly powered via the antenna 318 by the mobile computing device 600 using NFC wireless powering techniques that would be apparent to one of skill in the art in possession of the present disclosure. At block 508 and in response to the wireless EEPROM device 316 in the transceiver device 300/400 being wirelessly powered due to the mobile computing device 600 being positioned with in the threshold distance of the transceiver device 300/400, the wireless EEPROM device 316 will provide wireless read access to the transceiver operating information stored therein to the mobile computing device 600. Continuing with the specific example provide above, the transceiver operating information provided via the wireless read access to the mobile computing device 600 may include the serial number and/or the part number for the transceiver device 300/400, and/or any other transceiver operating information that one of skill in the art in possession of the present disclosure would recognize as enabling the fabric connection assist transceiver device identification functionality discussed below.

In response to retrieving the transceiver operating information via the wireless read access to the wireless EEPROM device 316 in the transceiver device 300/400, the fabric connection assist engine in the mobile computing device 600 of the present disclosure may determine whether that transceiver operating information matches the fabric connection component (e.g., a QSFP28-DD transceiver device in the illustrated example) that has been selected for connection to the port that is currently being connected to the fabric (i.e., port 15 in the illustrated example).

In response to determining that the transceiver operating information retrieved via the wireless read access to the wired EEPROM device 316 in the transceiver device 300/400 does not match the fabric connection component (e.g., a QSFP28-DD transceiver device in the illustrated example) that has been selected for connection to the port that is currently being connected to the fabric (i.e., port 15 in the illustrated example), the fabric connection assist engine in the mobile computing device 600 may identify to the fabric connection technician that the transceiver device 300/400 that is within the threshold distance of the mobile computing device 600 is not the transceiver device that is selected for connection to the port that is currently being connected to the fabric.

For example, as illustrated in FIG. 6B, the fabric connection assist screen 606 on the mobile computing device 600 may also include a transceiver device information section 614 that may provide information about whether or not the transceiver device that is within the threshold distance of the mobile computing device 600 is the transceiver device that was selected for connection to the port on the fabric device that is currently being connected to the fabric. In the illustrated example, the transceiver operating information received from the transceiver device 300/400 did not match the transceiver device selected for connection to the port that is currently being connected to the fabric, and the transceiver device information section 614 indicates "non-selected transceiver device detected" to identify to the user that the transceiver device that is within a threshold distance of the mobile computing device 600 is not the transceiver device selected for connection to the port on the fabric device that is currently being connected to the fabric.

However, while the specific example discussed above describes identifying to a user whether they have positioned their mobile computing device 600 within a threshold distance of a transceiver device that has been selected for connecting a port to the fabric, one of skill in the art in possession of the present disclosure will appreciate that the fabric connection assist engine in the mobile computing device 600 may provide other information as well. For example, as discussed above and as can be seen in FIG. 6B, the supported fabric connection component section 612 on the mobile computing device 600 identifies transceiver devices other than the transceiver device that was "selected" for connecting a port to the fabric (e.g., the "QSFP56-DD" transceiver device, the "QSFP+" transceiver device, and the "OSFP" transceiver device in FIG. 6B that are compatible with the port on the fabric device that is currently being connected to the fabric, and thus may be used for connecting the port to the fabric as well.

To provide a specific example, the fabric connection technician may be performing the "NFC tap" operations discussed above in order to find the transceiver device selected for connecting the port to the fabric. In some embodiments, transceiver operating information received via an "NFC tap" operation may be used by the fabric connection assist engine to determine that a transceiver device is not the "selected" transceiver device, but is still compatible for connecting the port to the fabric. In such an example, the transceiver device information section 614 may display to a user that a transceiver device within the threshold distance of the mobile computing device 600 is not the selected transceiver device, but is compatible for connecting the port to the fabric (e.g., by identifying that the user has "NFC tapped" one of the non-selected (but compatible) transceiver devices included in the supported fabric connection component section 612). As such, the fabric connection assist engine in the mobile computing device 600 may identify compatible, non-selected transceiver devices for connecting ports to a fabric.

In some embodiments, the fabric connection technician may not be able to locate the "selected" transceiver device in the inventory available to the user, and following a plurality of "NFC tap" operations on a plurality of transceiver devices, the fabric connection assist engine in the mobile computing device 600 may identify to the fabric connection technician one or more of the compatible transceiver device(s) that were "NFC tapped" using the mobile computing device 600 for connecting the port to the fabric (e.g., by identifying that the selected transceiver device has not been located and one or more of the compatible transceiver device(s) that have been located in the transceiver device information section 614). Furthermore, the fabric connection assist engine in the mobile computing device 600 may also display any information about those compatible transceiver devices in transceiver device information section 614 (e.g., how those transceiver device(s) differ from the "selected" transceiver device, additional information for connecting those compatible transceiver device(s) to the port, and/or other transceiver device information that would be apparent to one of skill in the art in possession of the present disclosure).

In response to determining that the transceiver operating information retrieved via the wireless read access to the wireless EEPROM device 316 in the transceiver device 300/400 matches the fabric connection component (e.g., aQSFP28-DD transceiver device in the illustrated example) that has been selected for connection to the port that is currently being connected to the fabric (i.e., port 15 in the illustrated example), the fabric connection assist engine in the mobile computing device 600 may identify to the fabric connection technician that the transceiver device 300/400 that is within the threshold distance of the mobile computing device 600 is the transceiver device that is selected for the port that is currently being connected to the fabric.

Figure 6C:
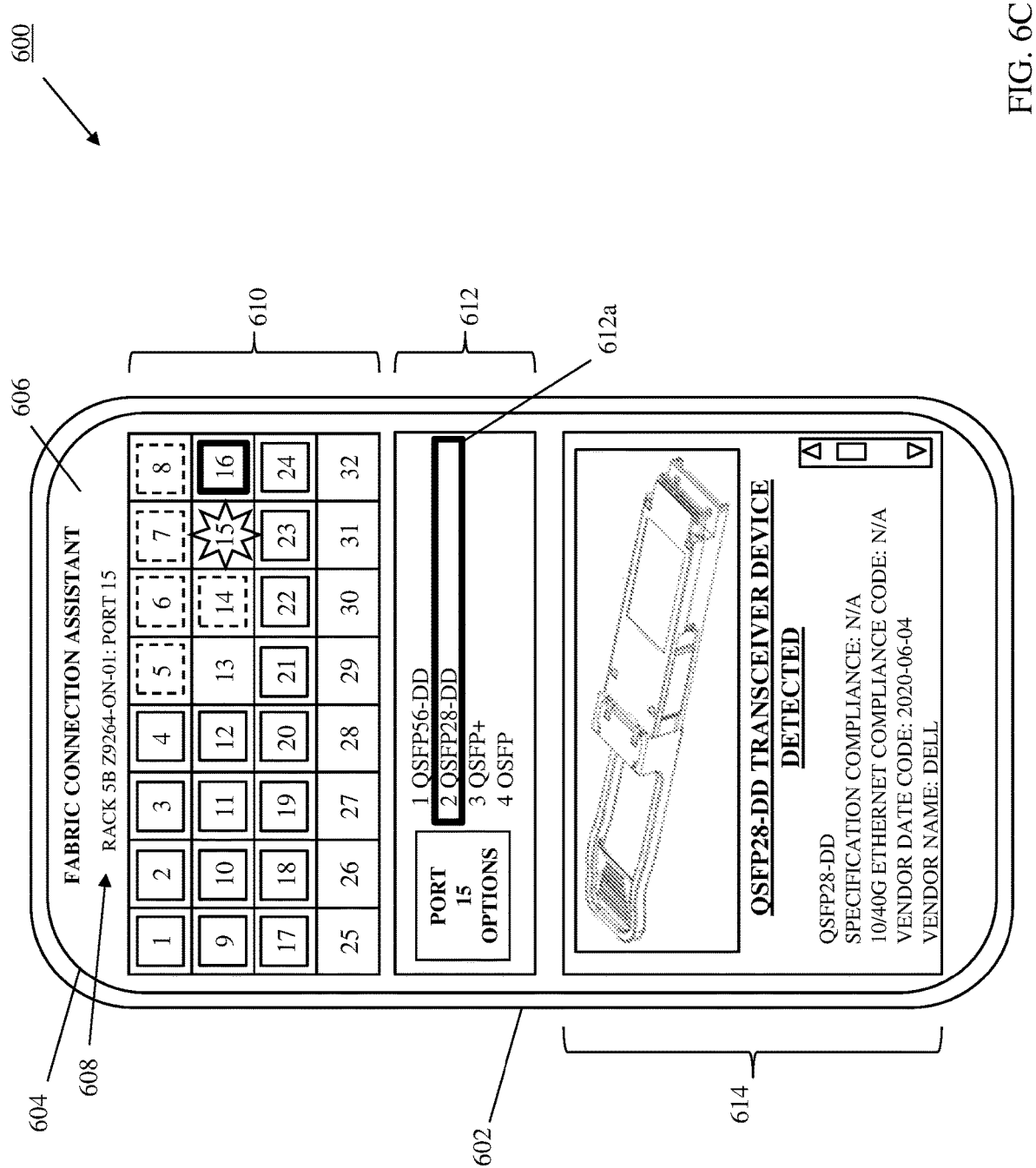
FIG. 6C is a schematic view illustrating an embodiment of the mobile computing device of FIG. 6A operating during the method of FIG. 5.

For example, as illustrated in FIG. 6C, the transceiver operating information received from the transceiver device 300/400 matched the transceiver device selected for connection to the port that is currently being connected to the fabric, and the transceiver device information section 614 indicates that the transceiver device that is within a threshold distance of the mobile computing device 600 is with the transceiver device selected for connection to the port on the fabric device that is currently being connected to the fabric. In the specific example illustrated in FIG. 6C, the transceiver device information section 614 may confirm that the transceiver device that is within a threshold distance of the mobile computing device 600 is the transceiver device selected for connection to the port on the fabric device that is currently being connected to the fabric by displaying an image of that transceiver device, displaying "QSFP28-DD TRANSCEIVER DEVICE DETECTED", and/or displaying other information about that transceiver device (e.g., a specification compliance, an Ethernet compliance code, a vendor date code, and a vendor name in the illustrated example). However, while specific examples have been provided for indicating whether a transceiver device within a threshold distance of the mobile computing device is the transceiver device selected for connection to the port on the fabric device that is currently being connected to the fabric, one of skill in the art in possession of the present disclosure will appreciate how other methods of providing such indications may be utilized while remaining within the scope of the present disclosure as well.

Furthermore, while the specific examples discussed above describe the identification of a single transceiver device for connecting a port to a fabric, one of skill in the art in possession of the present disclosure will appreciate how multiple transceiver devices may be identified for connecting multiple respective ports to fabric(s) using the fabric connection assist engine in the mobile computing device 600. In some embodiments, a fabric connection technician may utilize the fabric connection assist engine in the mobile computing 600 to select respective transceiver devices for connecting multiple respective ports on one or more fabric devices to one or more fabrics. For example, the fabric connection technician may gather fabric connection information for each of the ports on one or more fabric devices in order to select respective transceiver device(s) for connecting those ports to fabric(s). The fabric connection technician may then proceed to an inventory of transceiver devices and physically acquire each of the transceiver devices selected by the fabric connection assist engine in the mobile computing device 600 in substantially the same manner described above so that each of those transceiver devices may be utilized to connect their corresponding ports to fabric(s).

The method 500 may then proceed to optional block 510 where wireless write access to the EEPROM systems is provided to the mobile computing device. In an embodiment, at optional block 510 and in response to the mobile computing device 600 being positioned within the threshold distance of the transceiver device 300/400, wireless write access to the wireless EEPROM device 316 may be provided to the mobile computing device 600. Similarly as described above, when the fabric connection technician places the mobile computing device 600 within the threshold distance of any transceiver device 300/400, the wireless EEPROM device 316 in that transceiver device 300/400 may be wirelessly powered via the antenna 318 by the mobile computing device 600 using NFC wireless powering techniques that would be apparent to one of skill in the art in possession of the present disclosure. At optional block 510 and in response to the wireless EEPROM device 316 in the transceiver device 300/400 being wirelessly powered due to the mobile computing device 600 being positioned within the threshold distance of the transceiver device 300/400, the wireless EEPROM device 316 may provide wireless write access to the mobile computing device 600 to enable the mobile computing device 600 to write data to the wireless EEPROM device 316.

In some embodiments, a fabric connection technician and/or the fabric connection assist engine in the mobile computing device 600 may determine that additional information relating to, for example, the configuration of the transceiver device 300/400 should be written to the wireless EEPROM device 316. As such, in embodiments in which wireless write access is enabled to the wireless EEPROM device 316, the fabric connection technician and/or the fabric connection assist engine in the mobile computing device 600 may write data to the wireless EEPROM device 316. For example, at optional block 510, the fabric connection technician and/or the fabric connection assist engine in the mobile computing device 600 may write data to a command/response buffer provided in the wireless EEPROM device 316 that may include optimized configuration information (e.g., configuration "snips" such as Forward Error Correction (FEC) settings, pre-emphasis values, and/or other transceiver device configuration information known in the art), information describing a usage history of the transceiver device 300/400 (e.g., identifying the fabric connection technician that has connected the transceiver device, identifying how the transceiver device functioned previously when connected to any fabric device (e.g., whether the transceiver device has satisfied operating thresholds when utilized with particular fabric devices), and/or other information relating the usage or performance of the transceiver device that would be apparent to one of skill in the art in possession of the present disclosure). However, while specific examples have been described of data that may be written to the wireless EEPROM device 316, one of skill in the art in possession of the present disclosure will appreciate how any of a variety of data may be written to the wireless EEPROM device 316 while remaining within the scope of the present disclosure as well.

Following block 508 or optional block 510, the method 500 returns to decision block 504. As such, the method 500 may loop through blocks 504, 506, 508, and optional block 510 to assist the fabric connection technician in physically acquiring transceiver devices that have been identified and/or selected for connection to a port on a fabric device that is being connected to a fabric via wireless access to transceiver operating information stored on those transceiver devices, while also allowing that fabric connection technician to write data to those transceiver devices in some embodiments, as long as the fabric connection technician is connecting fabric devices to fabrics.

If, at decision block 504, the transceiver device is connected to a networking device, the method 500 proceeds to block 512 where EEPROM system wireless communications are disabled. As will be appreciated by one of skill in the art in possession of the present disclosure, blocks 506 and 508 of the method 500 may result in the fabric connection technician physically acquiring the transceiver device 300/400 that was identified and/or selected using the fabric connection assist engine in the mobile computing device 600 for connection to the port 206 on the networking device 200 (i.e., the port on the fabric device that is currently being connected to the fabric as discussed above).

Figure 7:
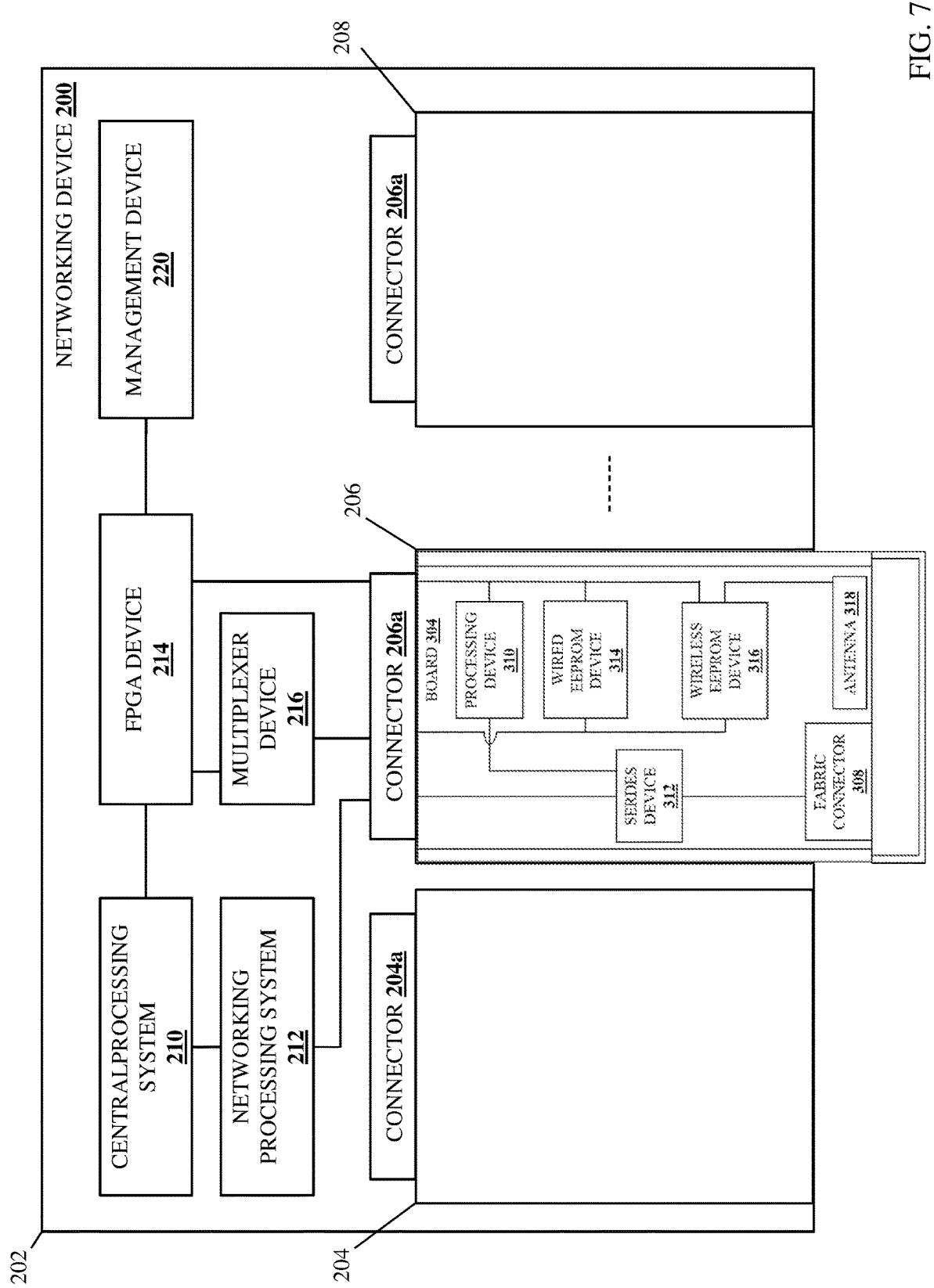
FIG. 7 is a schematic view illustrating an embodiment of the transceiver device of FIG. 3 connected to the networking device of FIG. 2 during the method of FIG. 5.

In response to physically acquiring the transceiver device 300/400, the fabric connection technician may connect the transceiver device 300/400 to the port 206 on the networking device 200 by positioning the transceiver device 300/400 adjacent the port 206 such that the networking device connector 306 is located immediately adjacent and aligned with the port 206, and then moving the transceiver device 300/400 relative to the port 206 such that the transceiver device 300/400 enters the port 206 and the networking device connector 306 engages the transceiver device connector 206a. With reference to FIG. 7, an example of the transceiver device 300 connected to the transceiver device connector 206a in the port 206 on the networking device 200 is illustrated, and one of skill in the art in possession of the present disclosure will appreciate how the transceiver device 400 may be connected to the transceiver device connector 206a in the port 206 on the networking device 200 in a similar manner. As will be appreciated by one of skill in the art in possession of the present disclosure, the connection of the transceiver device 300/400 to the networking device 200 may result in the networking device 200 powering the transceiver device 300/400 (e.g., the networking device 200 may power the processing device 310, the wired EEPROM device 314, the wireless EEPROM device 316), with the FPGA device 214 controlling the transceiver device 300/400 via the low speed control lines discussed above.

Following the connection of the transceiver device 300/400 to the networking device 200 as discussed above, wireless communications capabilities of the wireless EEPROM device 316 are disabled at block 512. For example, the disabling of wireless communications at block 512 may include the disabling of the antenna 318 in the transceiver device 300/400, the disabling of wireless communication functionality in the wireless EEPROM device 316, and/or other operations that one of skill in the art in possession of the present disclosure would recognize as preventing the transceiver device 300/400 from performing wireless communications. In a specific example, the wireless EEPROM device 316 and/or the transceiver device 300/400 may be configured to disable the wireless communication capabilities at block 512 in response to being powered by the networking device 200 (e.g., in response to being connected to "Vcc"). As will be appreciated by one of skill in the art in possession of the present disclosure, the disabling of the wireless communications capabilities in the transceiver device 300 may prevent a mobile computing device from performing the wireless reads and/or wireless writes with the wireless EEPROM device 316 as discussed above.

As will be appreciated by one of skill in the art in possession of the present disclosure, the disabling of the wireless communication capabilities in the transceiver device 300/400 will prevent the transceiver device 300/400 from operating like a wireless antenna extending from the networking device 200, which would require corresponding wireless communication certifications. However, one of skill in the art in possession of the present disclosure will also appreciate how block 512 of the method 500 may be skipped in the event that the wireless communication certifications discussed above are obtained, or if the wireless communications capabilities of the transceiver device 300/400 when connected to the networking device 200 are otherwise not an issue.

The method 500 then proceeds to block 514 where wired read access to the transceiver operating information in the EEPROM system is provided to the networking device. With reference back to FIG. 7, in an embodiment of block 514, wired read access to the transceiver operating information stored in either the wired EEPROM device 314 or the wireless EEPROM device 316 is provided to the networking device 200. As can be seen in FIG. 7, the connection of the transceiver device 300/400 to the networking device 200 connects the wired EEPROM device 314 and the wireless EEPROM device 316 to the central processing system 210 (e.g., via the FPGA device 214 and the multiplexer device 216). As will be appreciated by one of skill in the art in possession of the present disclosure, at block 514, the wired EEPROM device 314 and/or the wireless EEPROM device 316 may provide wired read access to the transceiver operating information stored thereon to the central processing system 210 included in the networking device 200 (e.g., a Network Operating System (NOS) operating on a host CPU SoC in the central processing system 210 may read that transceiver operating information via the wired connections provided in the networking device 200 and the transceiver device 300).

To provide a specific example, the disabling of the wireless communication capabilities in the transceiver device 300 may completely disable the wireless EEPROM device 316, and thus the central processing system 210 may utilize wired read access to the wired EEPROM device 314 to read the transceiver operating information at block 514. However, in another specific example, the disabling of the wireless communication capabilities in the transceiver device 300 may only disable wireless functionality in the wireless EEPROM device 316, and thus the central processing system 210 may utilize wired read access to the wired EEPROM device 314 or the wireless EEPROM device 316 to read the transceiver operating information at block 514. Furthermore, in embodiments utilizing the transceiver device 400, the disabling of the wireless communication capabilities in the transceiver device 300 will only disable wireless functionality in the wireless EEPROM device 316, and thus the central processing system 210 may utilize wired read access to the wireless EEPROM device 316 to read the transceiver operating information at block 514. However, while several specific examples have been provided, one of skill in the art in possession of the present disclosure will appreciate how the wired read access at block 514 may be performed in other manners that will fall within the scope of the present disclosure as well.

Furthermore, while the use of the wired read access to the EEPROM system in the transceiver device 300/400 is described above as being used to read the transceiver operating information stored thereon, one of skill in the art in possession of the present disclosure will appreciate how any information stored on the EEPROM system may be read at block 514. For example, any information written to the EEPROM system at optional block 510 may be read at block 514 via the wired read access. To provide a specific example, the central processing system 210 included in the networking device 200 (e.g., a Network Operating System (NOS) operating on a host CPU SoC in the central processing system 210) may read the optimal configuration information discussed above as being written to the EEPROM system at optional block 510 and, in response, may override the default port configuration for the port 206 or perform other operations that would be apparent to one of skill in the art in possession of the present disclosure. As such, the command/response buffer provided in the wireless EEPROM device 316 may be used as a communication channel between the fabric connection technician and the central processing system 210/NOS.

Following block 514, the method 500 returns to decision block 504. As such, the method 500 may loop through blocks 504, 512, and 514 such that, as long as the transceiver device 300/400 is connected to the networking device 200, wireless communication capabilities in the transceiver device 300/400 may be disabled, and wired read access to the transceiver operating information in the EEPROM system is provided to the networking device 200.

Thus, systems and methods have been described that provide for the wireless identification of a transceiver device that is not connected to a networking device to instruct a user to use that transceiver device to connect that networking device to a fabric. For example, the fabric connection assist transceiver device identification system of the present disclosure may include a transceiver device having a chassis. A board housed in the chassis includes networking device connector that is configured to connect to a networking device, a fabric connector that is configured to connect to a fabric, an antenna, and a wireless Electronically Erasable Programmable Read-Only Memory (EEPROM) device that is coupled to the networking device connector and the antenna. The wireless EEPROM stores first transceiver operating information in at least one first storage element included in the wireless EEPROM device, and provides wireless read access to the first transceiver operating information to a mobile computing device via the antenna when the mobile computing device is positioned a threshold distance from the antenna while the networking device connector is not connected to a networking device. As such, a user with the mobile computing device may confirm that a transceiver device selected based on a recommendation by a fabric connection assist engine is the correct transceiver device for connecting a networking device to a fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A transceiver device, comprising:
   a chassis;
   a transceiver circuit board included in the chassis;
   a networking device connector that is included on the transceiver circuit board and that is configured to directly connect to a networking port on a networking device;
   a fabric connector that is included on the transceiver circuit board and that is configured to connect to fabric cabling to couple a fabric to the networking device when the networking device connector is directly connected to a networking port on a networking device;
   an antenna that is included on the transceiver circuit board; and
   a wireless Electronically Erasable Programmable Read-Only Memory (EEPROM) device that is included on the transceiver circuit board, that is coupled to the networking device connector and the antenna, and that is configured to:
   store first transceiver operating information in at least one first storage element included in the wireless EEPROM device; and provide, via the antenna in response to a mobile computing device being positioned within a threshold distance of the antenna when the networking device connector is not connected to a networking device, wireless read access to the first transceiver operating information stored in the at least one first storage element in the wireless EEPROM device to the mobile computing device.

2. The system of claim 1, further comprising:
a wired EEPROM device that is included on the transceiver circuit board, that is coupled to the networking device connector and the wireless EEPROM device, and that is configured to:
store second transceiver operating information in at least one second storage element included in the wired EEPROM device, wherein the second transceiver operating information includes the first transceiver operating information; and
provide, via the networking device connector to a networking device when the networking device connector is directly connected to a networking port on that networking device, wired read access to the second transceiver operating information stored in the at least one second storage element in the wired EEPROM device.

3. The system of claim 2, wherein the wireless EEPROM device is configured to:
provide, via the antenna to a mobile computing device when the networking device connector is not directly connected to a networking port on a networking device, wireless write access to the at least one first storage element in the wireless EEPROM device, wherein the wired EEPROM device is configured as a read-only memory device.

4. The system of claim 1, wherein the wireless EEPROM device is configured to:
provide, via the antenna to a mobile computing device when the networking device connector is not directly connected to a networking port on a networking device, wireless write access to the at least one first storage element in the wireless EEPROM device; and
provide, via the networking device connector to a networking device when the networking device connector is directly connected to a networking port on that networking device, wired read access to the first transceiver operating information stored in the at least one first storage element in the wireless EEPROM device.

5. The system of claim 4, wherein the wireless EEPROM device is configured to:
receive, via the antenna from the mobile computing device when the networking device connector is not directly connected to a networking port on a networking device, networking device configuration information using the wireless write access and in the at least one first storage element in the wireless EEPROM device; and
provide, via the networking device connector to a networking device when the networking device connector is directly connected to a networking port on that networking device, the wired read access to the networking device configuration information in the at least one first storage element in the wireless EEPROM device.

6. The system of claim 1, wherein wireless communication capabilities in the wireless EEPROM device are configured to be automatically disabled in response to the networking device connector being directly connected to a networking port on a networking device.

7. A fabric connection assist transceiver device identification system, comprising:
a mobile computing device including a fabric connection assist engine; and
a transceiver device including:
a networking device connector that is configured to directly connect to a networking port on a networking device;
a fabric connector that is configured to connect to fabric cabling to couple a fabric to the networking device when the networking device connector is directly connected to a networking port on a networking device; and
a wireless Electronically Erasable Programmable Read-Only Memory (EEPROM) system that is coupled to the networking device connector and that is configured to:
store first transceiver operating information in at least one first storage element included in the wireless EEPROM system; and
provide, in response to the mobile computing device being positioned within a threshold distance of the wireless EEPROM system when the networking device connector is not connected to a networking device, wireless read access to the first transceiver operating information stored in the at least one first storage element in the wireless EEPROM system to the fabric connection assist engine included in the mobile computing device.

8. The fabric connection assist transceiver device identification system of claim 7, wherein the transceiver device includes:
a wired EEPROM device that is coupled to the networking device connector and the wireless EEPROM system, and that is configured to:
store second transceiver operating information in at least one second storage element included in the wired EEPROM device, wherein the second transceiver operating information includes the first transceiver operating information; and
provide, via the networking device connector to a networking device when the networking device connector is directly connected to a networking port on that networking device, wired read access to the second transceiver operating information stored in the at least one second storage element in the wired EEPROM device.

9. The fabric connection assist transceiver device identification system of claim 8, wherein the wireless EEPROM system is configured to:
provide, to the mobile computing device when the networking device connector is not directly connected to a networking port on a networking device, wireless write access to the at least one first storage element in the wireless EEPROM system, wherein the wired EEPROM device is configured as a read-only memory device.

10. The fabric connection assist transceiver device identification system of claim 7, wherein the wireless EEPROM system is configured to:
provide, to the mobile computing device when the networking device connector is not directly connected to a networking port on a networking device, wireless write access to the at least one first storage element in the wireless EEPROM system; and provide, via the networking device connector to a networking device when the networking device connector is directly connected to a networking port on that networking device, wired read access to the first transceiver operating information stored in the at least one first storage element in the wireless EEPROM system.

11. The fabric connection assist transceiver device identification system of claim 10, wherein the wireless EEPROM system is configured to:
receive, from the mobile computing device when the networking device connector is not directly connected to a networking port on a networking device, networking device configuration information using the wireless write access and in the at least one first storage element in the wireless EEPROM system; and
provide, to a networking device when the networking device connector is directly connected to a networking port on that networking device, the wired read access to the networking device configuration information in the at least one first storage element in the wireless EEPROM system.

12. The fabric connection assist transceiver device identification system of claim 7, wherein wireless communication capabilities in the wireless EEPROM system are configured to be automatically disabled in response to the networking device connector being directly connected to a networking port on a networking device.

13. The fabric connection assist transceiver device identification system of claim 7, wherein the mobile computing device is configured to:
wirelessly read the first transceiver operating information stored in the at least one first storage element in the wireless EEPROM system using the wireless read access when the networking device connector is not directly connected to a networking port on a networking device; and
verify that the first transceiver operating information identifies that the transceiver device is configured to connect a networking device to a fabric and provide threshold communication capabilities and, in response, provide an instruction for display on the mobile computing device via the fabric connection assist engine to use the transceiver device to connect the networking device to the fabric.

14. A method for identifying transceiver devices for use in connecting a device to a fabric, comprising:
storing, by a wireless Electronically Erasable Programmable Read-Only Memory (EEPROM) device that is included in a transceiver device and coupled to an antenna that is included in the transceiver device, first transceiver operating information in at least one first storage element included in the wireless EEPROM device;
activating, by the wireless EEPROM device in response to a mobile computing device being positioned within a threshold distance of the antenna when a networking device connector that is included in the transceiver device and coupled to the wireless EEPROM device is not directly connected to a networking port on a networking device, wireless read access to the at least one first storage element included in the wireless EEPROM device;
providing, by the wireless EEPROM device via the antenna to the mobile computing device, the wireless read access to the first transceiver operating information stored in the at least one first storage element in the wireless EEPROM device;
directly connecting, by the networking device connector on the transceiver device, to a networking port on a networking device; and
connecting, by a fabric connector on the transceiver device, to fabric cabling to couple a fabric to the networking device via the direct connection of the networking device connector to the networking port on the networking device.

15. The method of claim 14, further comprising:
storing, by a wired EEPROM device that is included in the transceiver device and coupled to the networking device connector and the wireless EEPROM device, second transceiver operating information in at least one second storage element included in the wired EEPROM device, wherein the second transceiver operating information includes the first transceiver operating information; and
providing, by the wired EEPROM device to a networking device when the networking device connector is directly connected to the networking port on the networking device, wired read access to the second transceiver operating information stored in the at least one second storage element in the wired EEPROM device via the networking device connector.

16. The method of claim 15, further comprising:
providing, by the wireless EEPROM device via the antenna to the mobile computing device when the networking device connector is not directly connected to the networking port on the networking device, wireless write access to the at least one first storage element in the wireless EEPROM device, wherein the wired EEPROM device is configured as a read-only memory device.

17. The method of claim 14, further comprising:
providing, by the wireless EEPROM device via the antenna to the mobile computing device when the networking device connector is not directly connected to the networking port on the networking device, wireless write access to the at least one first storage element in the wireless EEPROM device; and
providing, by the wireless EEPROM device to the networking device when the networking device connector is directly connected to the networking port on the networking device, wired read access to the first transceiver operating information stored in the at least one first storage element in the wireless EEPROM device via the networking device connector.

18. The method of claim 17, further comprising:
receiving, by the wireless EEPROM device via the antenna from the mobile computing device when the networking device connector is not directly connected to the networking port on the networking device, networking device configuration information using the wireless write access and in the at least one first storage element in the wireless EEPROM device; and
providing, by the wireless EEPROM device to the networking device when the networking device connector is directly connected to the networking port on the networking device, the wired read access to the networking device configuration information in the at least one first storage element in the wireless EEPROM device.

19. The method of claim 14, further comprising:
automatically disabling, in the wireless EEPROM device in response to the networking device connector being directly connected to the networking port on the networking device, wireless communication capabilities.

20. The method of claim 14, further comprising:
wirelessly reading, by the mobile computing device via the antenna when the networking device connector is not directly connected to the networking port on the networking device, the first transceiver operating information stored in the at least one first storage element in the wireless EEPROM system using the wireless read access; and
verifying, by the mobile computing device, that the first transceiver operating information identifies that the transceiver device is configured to connect the networking device to the fabric and provide threshold communication capabilities and, in response, providing an instruction for display on the mobile computing device to use the transceiver device to connect the networking device to the fabric.

* * * * *